Sept. 4, 1956  H. T. BURKEY  2,761,421
FISH DIVERTING METHOD

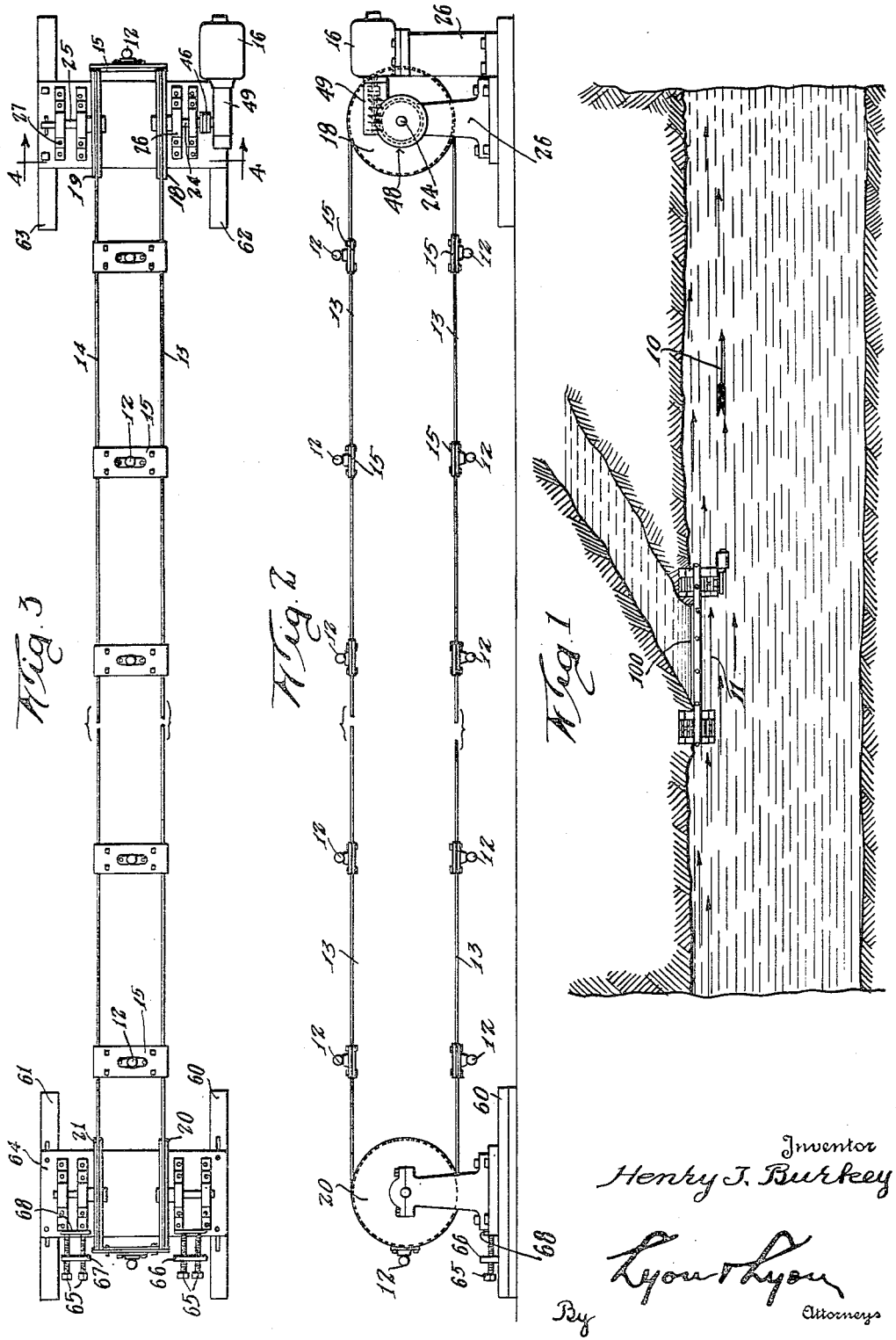

Original Filed Dec. 31, 1946  3 Sheets-Sheet 2

Inventor
Henry T. Burkey
Lyon & Lyon
Attorneys

Sept. 4, 1956  H. T. BURKEY  2,761,421
FISH DIVERTING METHOD
Original Filed Dec. 31, 1946  3 Sheets-Sheet 3

Inventor
Henry T. Burkey
By Lyon & Lyon
Attorneys

United States Patent Office 2,761,421
Patented Sept. 4, 1956

2,761,421

FISH DIVERTING METHOD

Henry Theodore Burkey, Los Angeles, Calif.

Original application December 31, 1946, Serial No. 719,533, now Patent No. 2,612,861, dated October 7, 1952. Divided and this application March 13, 1952, Serial No. 276,342

5 Claims. (Cl. 119—3)

The present invention relates to a method for causing fish to travel in desired paths, the present application being a division of my copending application, Serial No. 719,533, filed December 31, 1946 for Fish Diverting Means and Method, now Patent No. 2,612,861, patented October 7, 1952.

After the spawning season certain fish, including baby salmon, migrate downstream in the directions of large bodies of water. However, often-times many of these fish are sidetracked into irrigation ditches, shallow streams and the like where they may perish either when they travel downstream as babies or when they return upstream as adults.

It is a characteristic of some fish, notably baby salmon, always to travel in the direction of water flow. During the irrigation season large amounts of water are diverted into irrigation ditches and a relatively large amount of fish may travel with the resulting rapid water stream into the irrigation ditches.

It is therefore an object of the present invention to provide an improved method for maintaining fish in desired streams and to simultaneously prevent them from entering undesired streams, ditches, canals and the like where they may otherwise perish, such as dead-end sloughs or streams emptying into a large body of water.

A specific object of the present invention is to provide a new method wherein a "progressive fish moving influence" is created, thereby to maintain fish in desired streams and simultaneously to prevent them from entering other undesired bodies of water.

The term "progressive fish moving influence" in this specification and appended claims is intended to mean an influence to which an instinct of a fish responds to tend to make the fish move progressively in predetermined directions with the means which causes the influence to exist. This means may be a traveling light.

Yet another specific object of the present invention is to provide a "traveling light" at points along a stream in such a manner as to induce fish to stay in desired streams of water by swimming past those positions where their paths might otherwise be diverted, the traveling light being produced either by moving and incandescent lamp bulb or by progessively energizing a series of spaced stationary lamp bulbs in predetermined order.

The features of the present invention which are believed to be novel are set forth with particularity in the appended claims. This invention itself, both as to its orgnaization and manner of operation, together with further objects and advantages thereof, may best be understood by reference to the following description taken in connection with the accompanying drawings, in which:

Figure 1 is a view in elevation of apparatus incorporating the present invention shown in somewhat magnified form at the junction of an irrigation ditch with a main stream of water in which it is desired to maintain fish even though a relatively rapid flow of water occurs between the main stream and the irrigation ditch.

Figure 2 is an enlarged side elevational view of the apparatus shown in Figure 1.

Figure 3 is a plan view of the top of the apparatus shown in Figure 2.

Figure 4:
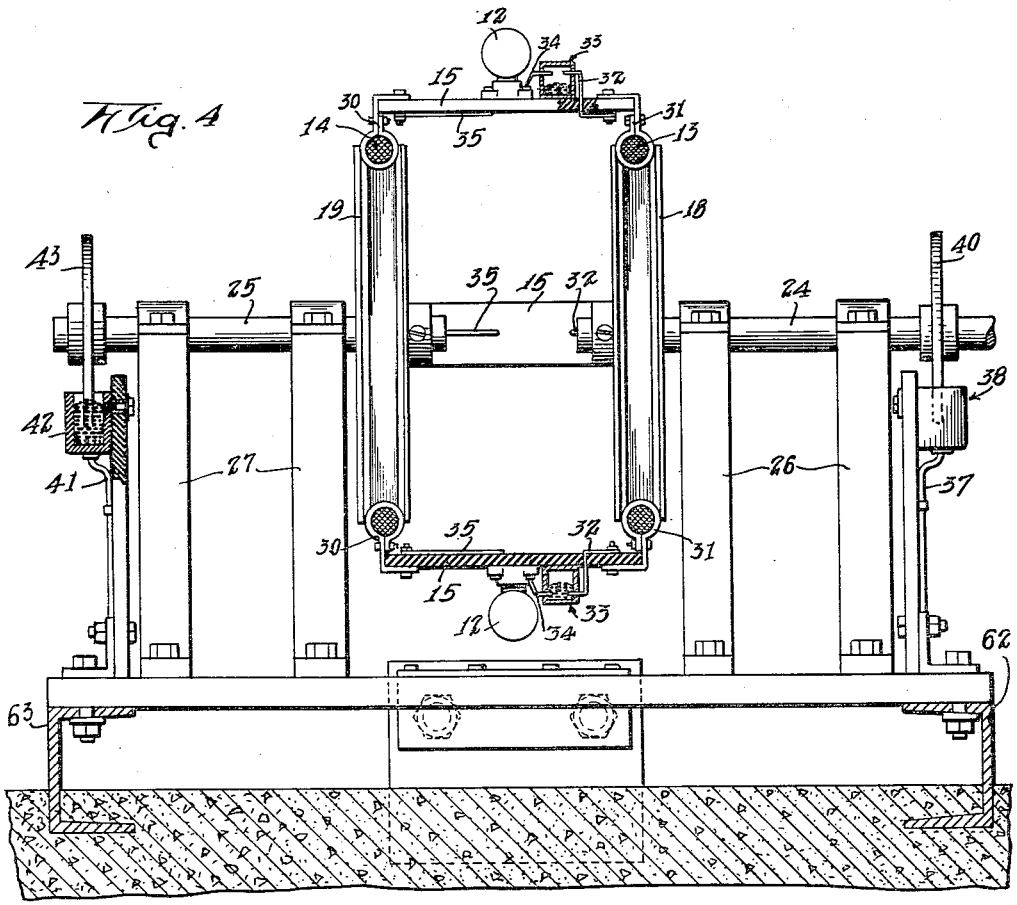
Figure 4 is an enlarged sectional view taken substantially on the line 4—4 of Figure 3.

A "traveling light" is produced by the apparatus shown in Figures 1 through 8 by moving a series of incandescent lamps in the direction of and substantially parallel to the direction of a stream flow indicated by the arrow 10, the traveling light traveling in the direction indicated by the arrow 11.

These lamp bulbs each having the reference numeral 12 are attached to and move with an endless belt which comprises a pair of endless metallic cable members 13 and 14 joined together so as to prevent relative movement therebetween by the series of lamp supporting members 15.

The endless belt comprising members 13, 14 and 15 is driven by an electric motor 16 which serves to drive one of the pair of driving pulleys 18, 19 over which the endless belt 13, 14, 15 passes, the driving pulleys being located on one bank of the irrigation ditch and the belt being supported on the other bank of the irrigation ditch on a pair of idler pulleys 20 and 21. The pulleys 18, 19 are mounted, respectively, on a rotatable shaft 24, 25 journaled in stationary bearing members 26 and 27.

The metallic cables 13 and 14 serve as conductors for the flow of electric current to the lamp bulbs 12 and are insulated one from the other by making each of the supporting members 15 of insulating material. Each one of the supporting members 15, as perhaps best seen in Figure 4, is firmly clamped to adjacent portions of cables 13 and 14 by metallic clamping members 30, 31 which serve also as electrical conductors for the flow of electric current. The conductors 13 and 14 are connected to opposite terminals of a source of adequate voltage and each lamp bulb 12 may have its opposite terminals connected to the energized cables 13, 14 through the serial circuit comprising: cable 13, clamping member 31, connecting lead 32, mercury switch 33, lead 34, lamp 12, lead 35, clamping member 30 and cable 14.

This serial circuit comprising the mercury switch 33 is thus opened or closed to correspondingly de-energize or energize its corresponding lamp 12, depending upon the position of the switch 33. When the switch 33 is in its upper position with respect to the endless belt, the corresponding lamp 12 is de-energized and, on the other hand, when the switch 33 is at its lower position with respect to the endless belt, the corresponding lamp 12 is illuminated.

One terminal of the energizing source 36 is connected to the cable 13 through lead 37, the mercury switch 38 comprising a pool of mercury 39 in which a brass disk 40 mounted on shaft 24 may rotate, shaft 24 and pulley 18. The other metallic cable 14 is similarly connected to the other terminal of source 36 through lead 41, mercury pool 42, brass disk 43, shaft 25 and pulley 19.

Figure 6:
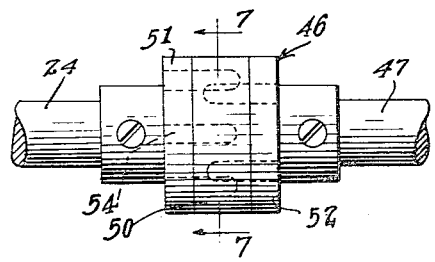
Figure 6 is a view in side elevation of an insulated shaft coupling in the apparatus shown in Figure 3.
Figure 7:
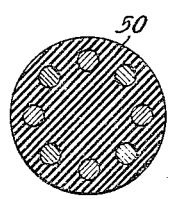
Figure 7 is a sectional view taken substantially on the line 7—7 of Figure 6.
Figure 8:
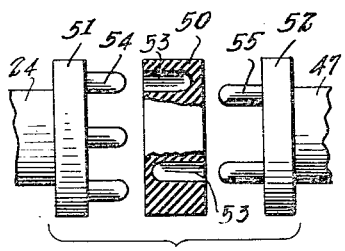
Figure 8 is a view corresponding to Figure 6 with the three component elements shown therein in separated spaced relationship.
Figure 5:
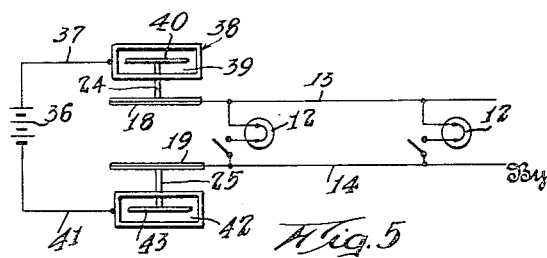
Figure 5 is a schematic representation of a portion of an electrical circuit in the apparatus shown in the previous figures.

The shaft 24 is insulated from the rotatable shaft of the driving motor 16 by providing intervening insulation in the clutch member 46 which is shown generally in Figure 3 and more specifically in Figures 6, 7 and 8. The shaft 24 is connected by means of the shaft 47 and worm gear drive 48 (Figure 2) to the rotatable shaft 49 and motor 16.

The disk of insulating material 50 is interposed between flanges 51 and 52, respectively, on shafts 24 and 47, the insulating material 50 being provided with eight equally spaced openings 53 therein for the reception of the prong members 54 and 55, respectively, on flanges 51 and 52, thereby to provide an insulated driving connection between shafts 24 and 47.

The idler pulleys 20 and 21 for endless cables 13 and 14 are rotatably mounted by a structure substantially identical to that described above for rotatably supporting the driving pulleys 18 and 19 and hence a detailed description of the supporting means for pulleys 20 and 21 is deemed unnecessary. It is noted, however, that it is not necessary to provide mercury brushes similar to the mercury brush 38 in Figure 4 to the shaft supporting pulleys 20 and 21 inasmuch as all of the electrical energy, including that for illuminating the lamps 12 and for driving the motor 16, is supplied at only one bank of the irrigation ditch. Further, the pulleys 20 and 21 may be adjusted in position on their stationary supporting members 60 and 61 (similar to members 62 and 63 in Figures 3 and 4) by slidably mounting the supporting structure 64 for pulleys 20 and 21 on members 60 and 61. Relative movement between supporting member 64 and stationary members 60 and 61 may be obtained by adjusting the positions of the four screw threaded members 65.

These screw threaded members 65 have their intermediate portions screw threadedly mounted in extensions 66 and 67 of the supporting member 64 and have their free ends abutting a stationary abutment 68, whereby screw threaded movement of the member 65 results in varying the tension of the endless belts comprising members 13, 14 and 15.

Figure 11:
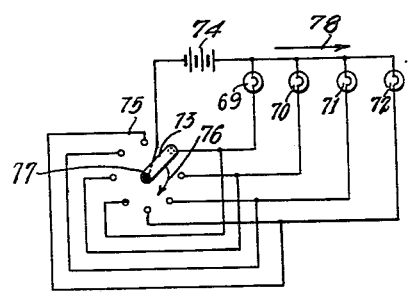
Figure 11 shows modified apparatus for producing a "traveling light" of the type described in connection with Figure 1 through 8.

Thus the apparatus described in connection with Figures 1 through 8 a "traveling light" is produced by moving incandescent lamp bulbs. In the arrangement in Figure 11 the same effect is produced but the lamp bulbs 69, 70, 71 and 72 are not moved, illusionary movement of a light source being obtained upon rotating the contact member 73 to thereby energize the lamp bulbs 69, 70, 71 and 72 in predetermined order.

Lamp bulbs 69, 70, 71 and 72 each have one of their terminals connected to a source of voltage 74 and the other one of their terminals connected to different stationary contacts of the commutator 75, the rotatable element 73 which is rotated in the direction of the arrow 76 being connected to the other terminal of source 74. It is apparent that upon rotating the element 73 uniformly about its axis 77 in the direction of arrow 76 an illusionary traveling light is produced which is sequentially moved in the direction indicated by the arrow 78. Thus the lamp bulbs 69, 70, 71 and 72 may be equally spaced on a supporting member bridging the banks of the irrigation ditch to produce the same effect produced by the apparatus described in connection with Figures 1 through 8.

Figure 9:
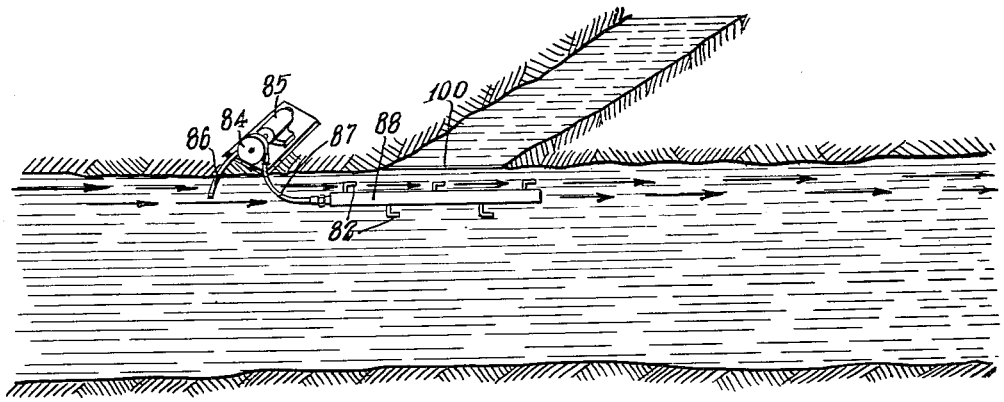
Figure 9 shows another apparatus incorporating the present invention located at the junction of an irrigation ditch with a main body of water to perform substantially the same function accomplished by the apparatus of the previous figures.
Figure 10:
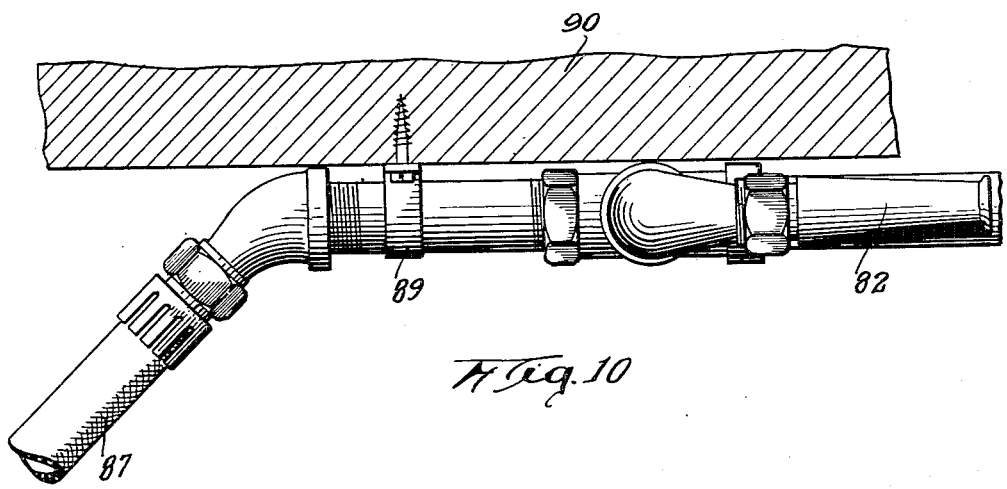
Figure 10 is an enlarged view of a portion of the apparatus shown in Figure 9.

In Figures 9 and 10 the apparatus for producing the same effect on fish is essentially non-electrical in nature. A stream of water is produced at the junction of a main stream with an irrigation ditch by pumping water through a series of nozzles 82 directed downstream. A hydraulic pump 84 driven by an electric motor 85 has its intake 86 in communication with the stream of water and its outlet 87 connected to a distributing manifold 88 to which each one of the nozzles 82 is in communication. The manifold 88 is supported along its length by clamping members 89 to a buoyant member 90, the buoyant member located at the entrance to the irrigation ditch and the nozzles 82 being submerged in the water of the main stream.

The nozzles 82 may take different forms and shapes and may comprise nozzles similar to those used in connection with household garden hoses.

Adult salmon may encounter the same pitfalls when returning upstream in the spawning season as they originally encountered in their downstream journey in their babyhood. The possibility of the adult salmon entering undesired streams leading to large bodies of water or dead-end sloughs is minimized by the same apparatus previously described, it being necessary, however, in the apparatus described in connection with Figures 1 to 8, inclusive and 11 to reverse the direction of the traveling light while the apparatus described in connection with Figures 9 and 10 may remain unaltered. The direction of the belt in Figures 1 to 8 may be reversed by reversing the direction of motor 16 in accordance with well established principles, while in Figure 11 the direction of rotation of the commutator arm 73 may likewise be reversed.

The apparatus described herein may or may not be used in conjunction with a mechanical and/or an electric fish screen of the types shown in my numerous United States Letters Patent on this subject. Preferably, an electric screen illustrated generally as the structure 100 is disposed in the vicinity of the entrance to the divergent stream or slough adjacent the other apparatus, in which case the undesired path of a fish is diverted by the joint action of the electric screen and the means described herein for producing a "progressive fish moving influence." In such case a fish, such as a salmon, whose instinct it is to "hit" obstacles repeatedly with increased force, may after "hitting" and "bouncing" away from a mechanical barrier and/or an electrified zone, produced by the fish screen 100, be guided away from the electrified zone by the progressive fish moving influence. Although the salmon may eventually determine that his "bucking" or "hitting" the barrier and/or electrified zone does not produce is intended result, the progressive fish moving influence serves to some extent to prevent salmon from congregating adjacent a fish screen through which some might possibly yet through and further to conserve the energy of the fish in their otherwise futile efforts.

While the particular embodiments of the present invention have been shown and described, it will be obvious to those skilled in the art that changes and modifications may be made without departing from this invention in its broader aspects and therefore the aim in the appended claims is to cover all such changes and modifications as fall within the true spirit and scope of this invention.

I claim:

1. In a fish diverting method in which fish are maintained in a first stream and diverted from a second stream, the step which comprises creating recurrently a progressive fish moving influence in the form of illumination that effectively moves in a direction which is unidirectional with respect to said first stream, such illumination being disposed at the junction of said first stream with said second stream and effectively moving across said second stream.

2. In a fish diverting method in which fish are maintained in a first stream and diverted from a second stream, the step which comprises creating recurrently illumination that effectively moves in a direction which is unidirectional with respect to said first stream, said illumination being disposed at the junction of said first stream with said second stream and effectively moving across said second stream.

3. In a fish diverting method in which fish are maintained in a first stream and diverted from a second stream, the step which comprises creating an artificially moved stream of water which is unidirectional with respect to said first stream, said stream of water being disposed at the junction of said first stream with said second stream.

4. In a fish diverting method in which fish are maintained in a first stream and diverted from a second stream which meet at a junction, the step which comprises creating a progressive fish moving influence in a direction which is unidirectional with respect to said first stream said fish moving influence being disposed at the junction of said first stream with said second stream and providing a path to which the fish are attracted so that they are influenced to move generally along such path.

5. In a fish diverting method in which fish are maintained in a first stream and diverted from a second stream which meet at a junction, the step which comprises creating a progressive fish moving influence at the junction of said first stream with said second stream, said fish moving influence providing a path to which the fish are attracted so that they are influenced to generally move along such path.

References Cited in the file of this patent
UNITED STATES PATENTS

| | | |
|---|---|---|
| 1,109,385 | Allison | Sept. 1, 1914 |
| 1,143,147 | Sherwood | June 15, 1915 |
| 1,263,077 | Larson et al. | Apr. 16, 1918 |
| 1,265,251 | Rush | May 7, 1918 |
| 1,596,310 | Samson | Aug. 17, 1926 |
| 1,699,828 | Wyckoff | Jan. 22, 1929 |
| 1,974,444 | Burkey | Sept. 25, 1934 |
| 2,470,521 | Preble | May 17, 1949 |
| 2,612,861 | Burkey | Oct. 7, 1952 |